US007387412B2

(12) United States Patent
Tsai

(10) Patent No.: US 7,387,412 B2
(45) Date of Patent: Jun. 17, 2008

(54) WORKING LIGHT STAND

(76) Inventor: Peter Tsai, 9F, No. 126, Yu-Ming 6th Rd., Taipei (TW)

( * ) Notice: Subject to any disclaimer, the term of this patent is extended or adjusted under 35 U.S.C. 154(b) by 135 days.

(21) Appl. No.: 11/497,430

(22) Filed: Aug. 2, 2006

(65) Prior Publication Data

US 2008/0030998 A1 Feb. 7, 2008

(51) Int. Cl.
*F21S 8/00* (2006.01)

(52) U.S. Cl. ........................ 362/427; 362/400; 362/428; 248/176.1; D26/63

(58) Field of Classification Search ................. 362/399, 362/400, 427, 428; 248/163.2, 176.1; D26/63
See application file for complete search history.

(56) References Cited

U.S. PATENT DOCUMENTS 5,984,490 A * 11/1999 Leen .......................... 362/400
D449,398 S * 10/2001 Tsao ........................... D26/63

* cited by examiner

*Primary Examiner*—Stephen F Husar
(74) *Attorney, Agent, or Firm*—Muncy, Geissler, Olds & Lowe, PLLC

(57) ABSTRACT

A stand for a working light includes a base capable of standing on a ground and a handle pivotally connected to the base via a pivotal member which is provided to joints between the base and the handle. The pivotal member is composed of a securing sleeve firmly connected to the handle, a contrast sleeve firmly connected to the base and a fastening knob with a threaded rod extending through the contrast sleeve, the base and into the securing sleeve to selectively secure engagement between the securing sleeve and the contrast sleeve such that after the working light is firmly mounted between two free ends of the handle, pivotal movement of the handle relative to the base, the working light angle is adjusted accordingly.

2 Claims, 4 Drawing Sheets

2
322
31
3
32
313
323
1

WORKING LIGHT STAND

BACKGROUND OF THE INVENTION

1. Field of the Invention

The present invention relates to a working light stand, and more particularly to a working light stand able to allow the working light to pivot relative to the stand so as to facilitate convenience of working.

2. Description of the Prior Art

In a working site, on stage or the like, a working light is normally associated with a stand which is able to stand the working light on the ground. When the working light is in application, the user normally positions the working light with the stand. After employment of the working light, the angle of the working light is fixed such that whenever the user needs to change the angle of the working light, the user will have to use every means possible to change the working light angle.

To overcome the shortcomings, the present invention tends to provide an improved working light stand to mitigate the aforementioned problems.

SUMMARY OF THE INVENTION

The primary objective of the present invention is to provide an improved working light stand having a base for standing on the ground and a handle pivotally connected to the base and having the working light firmly attached thereto so that when the handle is pivoted relative to the base, the angle of the working light is changed.

In order to accomplish the objective, the working light stand of the present invention includes a base capable of standing on the ground and a handle pivotally connected to the base via a pivotal member. The pivotal member is composed of a securing sleeve securely connected to a free end of the handle and having first teeth formed on a side face of the securing sleeve, a contrast sleeve securely connected to a free end of the base and having second teeth formed on a side face thereof to correspond to and mesh with the first teeth of the securing sleeve and a fastening knob with a threaded rod extending through the contrast sleeve and into the securing sleeve to selectively secure engagement between the first teeth and the second teeth. Therefore, when the fastening knob is loosened, the securing sleeve is pivotal relative to the contrast sleeve. Because the working light is securely mounted on the handle, pivotal movement of the handle also allows the working light to move accordingly. As a result, the working light angle is changed conveniently.

Other objects, advantages and novel features of the invention will become more apparent from the following detailed description when taken in conjunction with the accompanying drawings.

DETAILED DESCRIPTION OF THE PREFERRED EMBODIMENT

Figure 1:
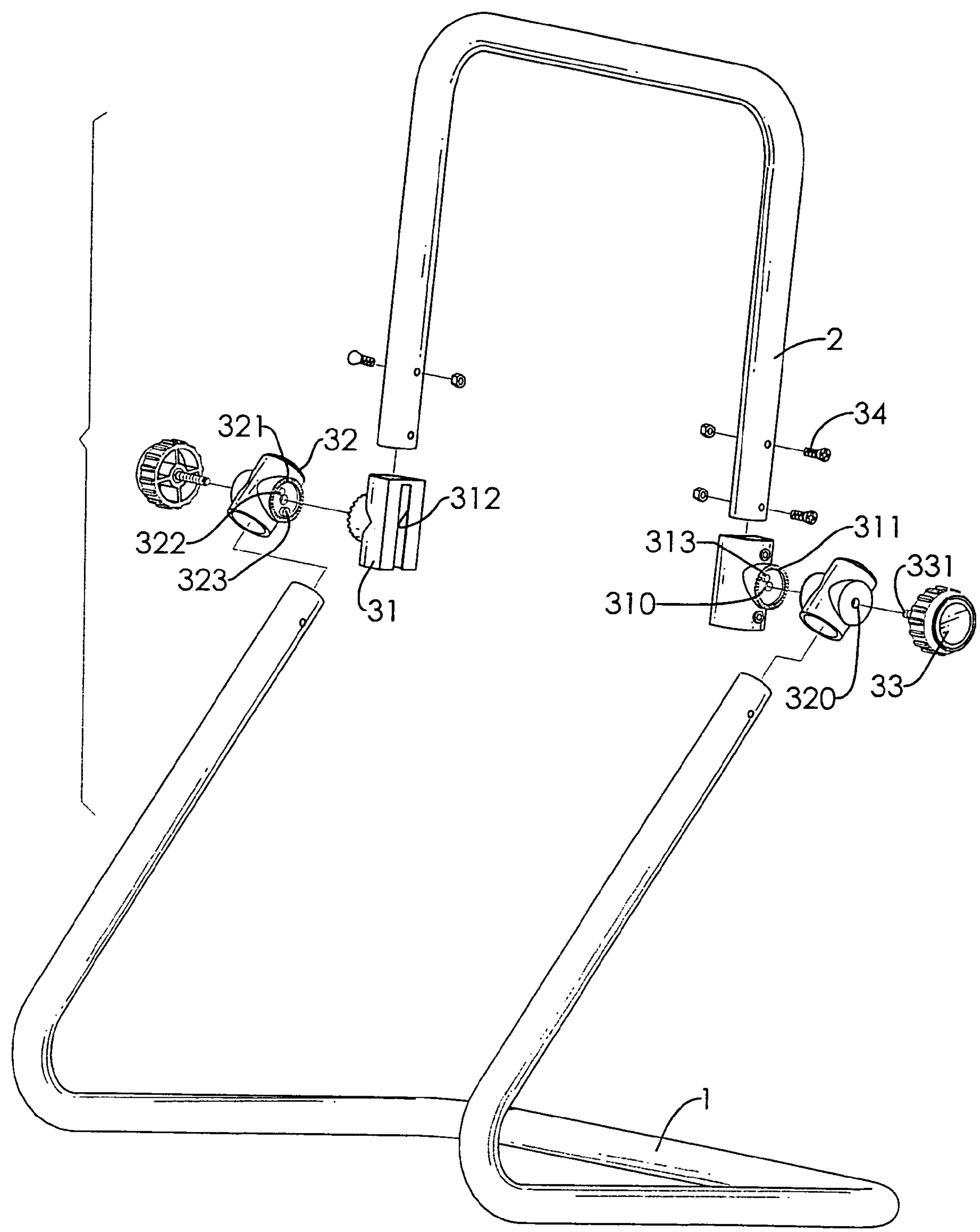
FIG. 1 is an exploded perspective view of the working light stand of the present invention.
Figure 2:
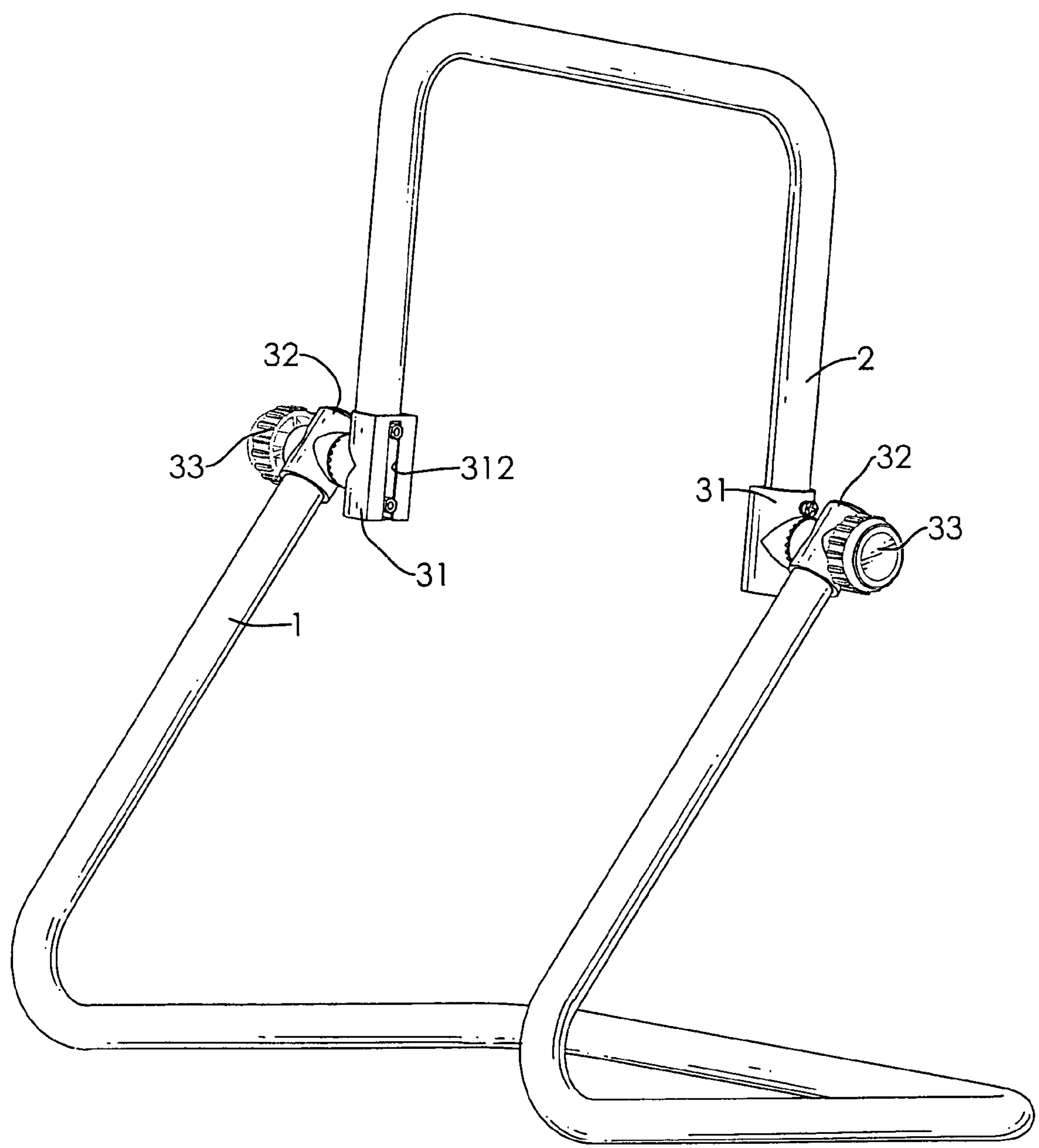
FIG. 2 is a perspective view showing that the working light stand is assembled.

With reference to FIGS. 1 and 2, it is noted that the working light stand in accordance with the present invention includes a base (1), a handle (2) and a pivotal member (3).

The base (1) is configured in such a manner that the base (1) is able to stand on a surface, e.g. the ground and has two free ends.

The handle (2) also has two free ends pivotally connected to the two free ends of the base (1) via the pivotal member (3). That is, two pivotal members (3) are respectively provided to combining the two free ends of the base (1) with the two free ends of the handle (2).

Each of the two pivotal members (3) is composed of a securing sleeve (31), a contracting sleeve (32) and a fastening knob (33). The securing sleeve (31) is sized to snugly receive therein one free end of the handle (2) and has a centrally defined first through hole (310), first teeth (311) annularly formed on a side face thereof and a cutout (312) defined in a side face opposite to that of the first teeth (311). Within an area surrounded by the first teeth (311), a first stop (313) is formed. After one free end of the handle (2) is received inside the securing sleeve (31), two fastening elements (34) such as a bolt and a nut combination are employed to secure the securing sleeve (31) to the free end of the handle (2).

The contrast sleeve (32) is sized to snugly receive therein one free end of the base (1) and has a centrally defined second through hole (320) corresponding to the first through hole (310) of the securing sleeve (31) and second teeth (321) formed on a side face thereof to correspond to and mesh with the first teeth (310) of the securing sleeve (31). Two second stops (322,323) are formed on an area surrounded by the second teeth (321). The two second stops (322,323) are not diagonally located relative to each other within the area surrounded by the second teeth (321).

Figure 3:
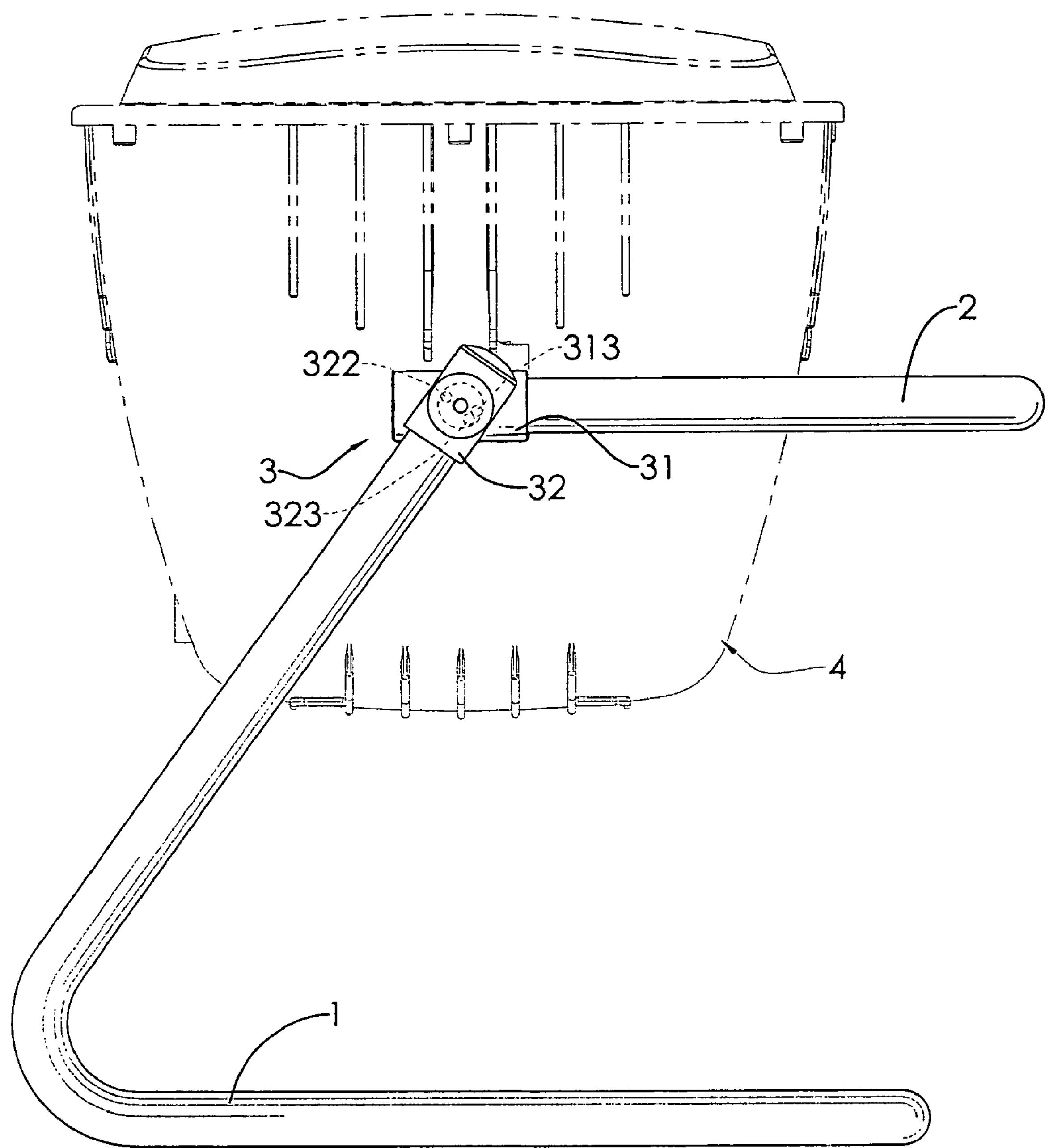
FIGS. 3 and 4 are schematic side plan views showing that the working light is pivoted with the handle of the working light stand of the present invention.
Figure 4:
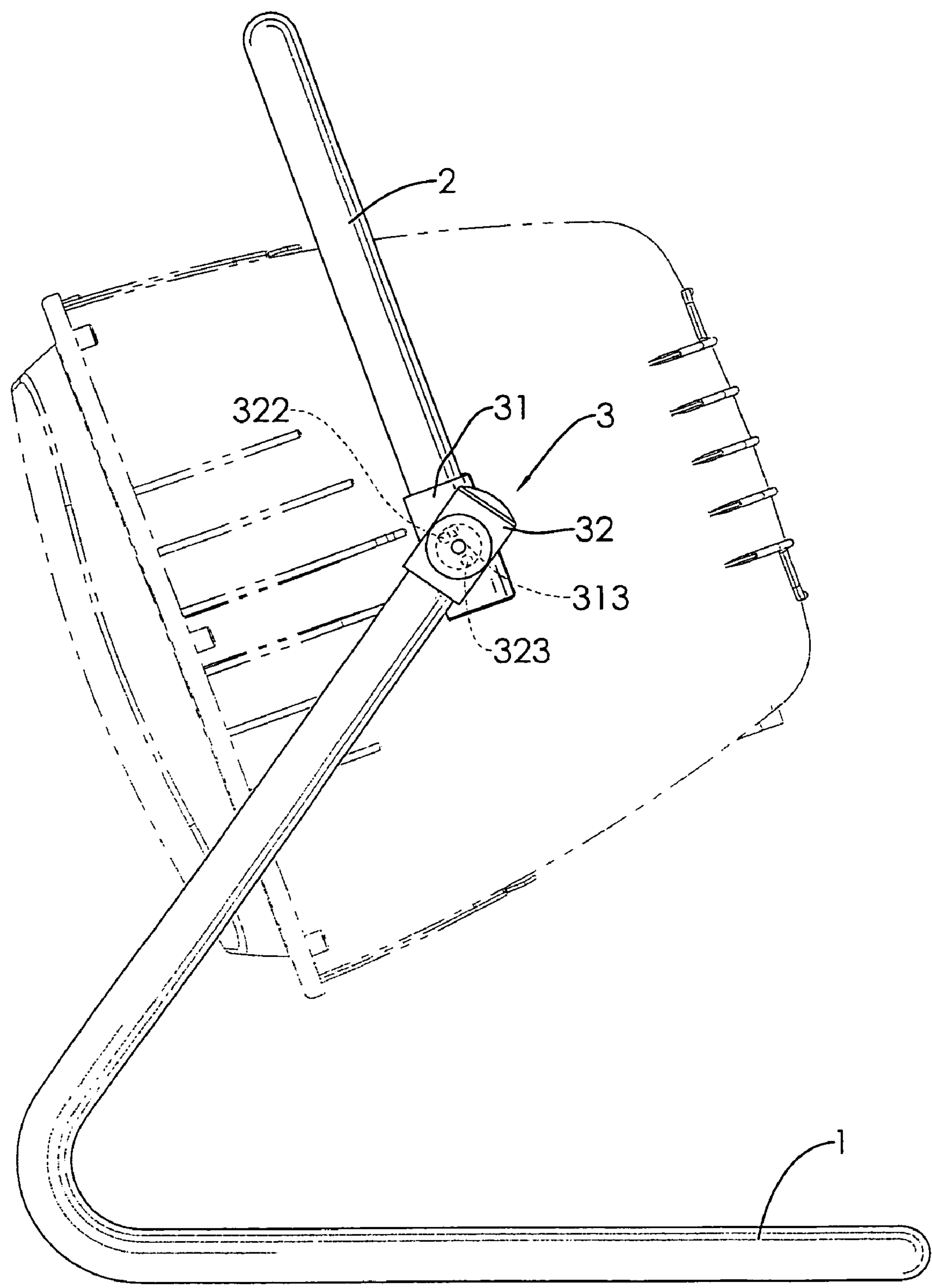

The fastening knob (33) has a threaded rod (331) extending out of the fastening knob (33). The threaded rod (331) extends threadingly through the second through hole (320) of the contrast sleeve (32), the free end of the base (1) and into the first through hole (310) of the securing sleeve (31) to secure engagement between the first teeth (311) and the second teeth (321). After the threaded rod (331) is extended into the securing sleeve (31), the user is then able to mount the working light (4), as shown in FIGS. 3 and 4, between the two free ends of the handle (2). That is, the working light (4) is firmly mounted between the two free ends of the handle (2) via any method known in the art. In this embodiment, the working light (4) is securely and firmly sandwiched in the cutouts (312) of the two securing sleeves (31) on the two free ends of the handle (2).

When the angle of the working light (4) is required to be changed, the user is able to loosen the fastening knob (33) to allow the engagement between the first teeth (311) of the securing sleeve (31) and the second teeth (321) of the contrast sleeve (32) to become loose. Thereafter, the user is able to pivot the handle (2) relative to the base (1). Accordingly, the angle of the working light (4) is changed in that the working light (4) is securely and firmly mounted on the handle (2). However, in order to avoid excessive pivotal movement of the handle (2) relative to the base (1), alternate engagement of the first stop (313) with both the two second stops (322,323) limit the pivotal movement of the handle (2) so that the working light (4) is protected.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A stand for a working light, the stand comprising:

a base capable of standing on a surface and having two free ends;

a handle pivotally connected to the base and having two free ends; and a pivotal member provided to each of the two free ends of the base and the two free ends of the handle allowing the handle to selectively pivot relative to the base and to firmly secure the working light between the two free ends of the handle, wherein the pivotal member is composed of:

a securing sleeve which is sized to securely receive therein one free end of the handle and has a centrally defined first through hole, first teeth formed on a side face thereof and a cutout defined in a side face opposite to that of the first teeth;

a contrast sleeve which is sized to securely receive therein one free end of the base and has a centrally defined second through hole corresponding to the first through hole of the securing sleeve and second teeth formed on a side face thereof to correspond to and mesh with the first teeth of the securing sleeve; and a fastening knob which has a threaded rod extending out of the fastening knob to extend threadingly through the second through hole of the contrast sleeve, the free end of the base and into the first through hole of the securing sleeve to selectively secure engagement between the first teeth and the second teeth such that the working light is securely and firmly sandwiched in the cutouts of the two securing sleeves on the two free ends of the handle so as to enable the working light angle to be changed when the handle is pivoted relative to the base after the fastening knob is loosened.

2. The stand as claimed in claim 1, wherein the securing sleeve has a first stop formed on an area surrounded by the first teeth and the contracting sleeve has two second stops formed on an area surrounded by the second teeth to alternately engage with the first stop when the securing sleeve is pivoted relative to the contracting sleeve such that pivotal angle of the handle relative to the base is limited.

* * * * *